(12) United States Patent
Zhao et al.

(10) Patent No.: US 10,207,819 B2
(45) Date of Patent: Feb. 19, 2019

(54) SHOOTING DEVICE AND UNMANNED AERIAL VEHICLE

(71) Applicant: Ewatt Technology Co., Ltd., Wuhan (CN)

(72) Inventors: Guocheng Zhao, Wuhan (CN); Yong Wan, Wuhan (CN); Kai Zhang, Wuhan (CN)

(73) Assignee: EWATT TECHNOLOGY CO., LTD., Wuhan (CN)

( * ) Notice: Subject to any disclaimer, the term of this patent is extended or adjusted under 35 U.S.C. 154(b) by 72 days.

(21) Appl. No.: 15/364,802

(22) Filed: Nov. 30, 2016

(65) Prior Publication Data

US 2017/0152061 A1 Jun. 1, 2017

(30) Foreign Application Priority Data

Nov. 30, 2015 (CN) .......................... 2015 1 0856080

(51) Int. Cl.
| | |
|---|---|
| *H04N 7/18* | (2006.01) |
| *B64D 47/08* | (2006.01) |
| *B64C 39/02* | (2006.01) |
| *G02B 26/10* | (2006.01) |
| *G03B 15/00* | (2006.01) |

(52) U.S. Cl.
CPC ............ *B64D 47/08* (2013.01); *B64C 39/024* (2013.01); *G02B 26/105* (2013.01); *G03B 15/006* (2013.01); *H04N 7/183* (2013.01); *B64C 2201/127* (2013.01); *G03B 2205/0023* (2013.01)

(58) Field of Classification Search
CPC ...... B64D 47/08; B64C 39/024; H04N 7/183; B03B 15/006; G02B 26/105
USPC ........................................................ 348/146
See application file for complete search history.

(56) References Cited

U.S. PATENT DOCUMENTS

| 4,941,012 A * | 7/1990 | Inabata ................. G02B 17/04 396/271 |
| 9,185,290 B1 * | 11/2015 | Lapstun ............. H04N 5/23238 |
| 2008/0185526 A1 * | 8/2008 | Horak ...................... G01J 5/08 250/353 |

\* cited by examiner

*Primary Examiner* — Nguyen T Truong
(74) *Attorney, Agent, or Firm* — Platinum Intellectual Property LLP

(57) ABSTRACT

The present invention discloses a shooting device and an unmanned aerial vehicle. The shooting device includes: a first reflector; a second reflector arranged to be opposite to a reflecting surface of the first reflector; a bracket, wherein the bracket includes: a connecting plate, a first rotating seat, which is fixedly connected with one end of the connecting plate in a rotatable manner and is used for clamping the first reflector, and a second rotating seat, which is fixedly connected with the other end of the connecting plate in the rotatable manner and is used for clamping the second reflector; driving parts, including a first driving part and a second driving part used for respectively driving the first rotating seat and the second rotating seat to rotate; and a camera arranged to be opposite to the reflecting surface of the second reflector. The technical problems of inconvenient control, low response speed, high requirements on lens and high cost of the shooting device for the unmanned aerial vehicle in the prior art are solved.

9 Claims, 1 Drawing Sheet

SHOOTING DEVICE AND UNMANNED AERIAL VEHICLE

RELATED APPLICATIONS

This application is a Non-provisional Application under 35 USC 111(a), which claims Chinese Patent Application Serial No. 201510856080.5, filed Nov. 30, 2015, the disclosure of all of which are hereby incorporated by reference in their entirety.

FIELD OF THE INVENTION

The present invention relates to the technical field of unmanned aerial vehicles, and particularly to a shooting device and an unmanned aerial vehicle.

BACKGROUND OF THE INVENTION

A pilotless aircraft is referred to as an "unmanned aerial vehicle", and is an unmanned aircraft that is manipulated by radio remote control equipment and its own program control device. No cockpit is mounted on the unmanned aerial vehicle, but an autopilot, the program control device, a signal collection device and other equipment are installed thereon. Personnel on the ground, on a naval vessel or a master remote control station carries out tracking, positioning, remote control, telemetering and digital transmission on the unmanned aerial vehicle by radar and other equipment. The unmanned aerial vehicle can take off just like an ordinary aircraft under radio remote control or is launched by a booster rocket, and can also be carried by a master into the air for flying.

When the unmanned aerial vehicle is flying in the air, a shooting device of the unmanned aerial vehicle in the prior art acquires a larger visual angle by rotating the entire shooting device, or acquires a larger visual field by adopting multiple shooting lenses. In the former mode, the shooting device is heavy, the accurate control of the shooting effect is inconvenient to achieve due to the overall rotation, the response speed is low, and the requirements on the lens are high. In the latter mode, since the multiple shooting lenses are adopted, the shooting images are incomplete, the requirements on the lenses are high, and the cost is relatively higher.

SUMMARY OF THE INVENTION

The present invention provides a shooting device and an unmanned aerial vehicle, in order to solve the technical problems of inconvenient control, low response speed, high requirements on lens and high cost of the shooting device for the unmanned aerial vehicle in the prior art, and to achieve the technical effects of convenient control, low cost, large shooting visual field, high response speed and high image quality of the shooting device.

To solve the aforementioned technical problems, the present invention provides a shooting device, including: a first reflector; a second reflector arranged to be opposite to a reflecting surface of the first reflector; a bracket, wherein the bracket includes: a connecting plate, a first rotating seat, which is fixedly connected with one end of the connecting plate in a rotatable manner and is used for clamping the first reflector, and a second rotating seat, which is fixedly connected with the other end of the connecting plate in the rotatable manner and is used for clamping the second reflector; driving parts, including a first driving part and a second driving part used for respectively driving the first rotating seat and the second rotating seat to rotate; and a camera arranged to be opposite to the reflecting surface of the second reflector, wherein a light path is reflected to a lens of the camera by the first reflector and the second reflector, and the camera shoots a photo.

Preferably, an included angle of the reflecting surface of the first reflector and the reflecting surface of the second reflector is 90 degrees.

Preferably, the first driving part and the second driving part respectively drive the first rotating seat and the second rotating seat to carry out reciprocating vibration at preset frequency.

Preferably, the reciprocating vibration angle is ±40°.

Preferably, the reciprocating vibration angle is ±20°.

Preferably, the first reflector and/or the second reflector are total reflection mirrors.

Preferably, the first reflector and/or the second reflector specifically are metal coated lenses.

The present application further provides an unmanned aerial vehicle, including the aforementioned shooting device.

The present application has the following beneficial effects:

According to the shooting device and the unmanned aerial vehicle provided by the present application, during shooting in a flying process, the driving parts drive the first rotating seat and the second rotating seat to rotate to drive the first reflector and the second reflector to vibrate at a preset frequency, which guarantees the quality of the shot image in the flying process on one hand, and increases the shooting visual angle on the other hand; the first rotating seat and the second rotating seat are respectively hinged with the first reflector and the second reflector and can rotate relatively to change the light path, so that the response speed of the shooting device is improved without rotating the entire shooting device, the technical problems of inconvenient control, low response speed, high requirements on lens and high cost of the shooting device for the unmanned aerial vehicle in the prior art are solved, and the technical effects of convenient control, low cost, large shooting visual field, high response speed and high image quality of the shooting device are achieved.

BRIEF DESCRIPTION OF THE DRAWINGS

To illustrate technical solutions in the embodiments of the present invention or in the prior art more clearly, a brief introduction on the accompanying drawings which are needed in the description of the embodiments is given below. Apparently, the accompanying drawings in the description below are merely some of the embodiments of the present invention.

REFERENCE SIGNS

100—shooting device, 1—first reflector, 2—second reflector, 3—bracket, 11—connecting plate, 12—first rotating seat, 13—second rotating seat, 4—camera.

DETAILED DESCRIPTION OF THE EMBODIMENTS

To better understand the aforementioned technical solutions, the aforementioned technical solutions will be illustrated below in detail in conjunction with the accompany drawings in the description and specific embodiments.

Figure 1:
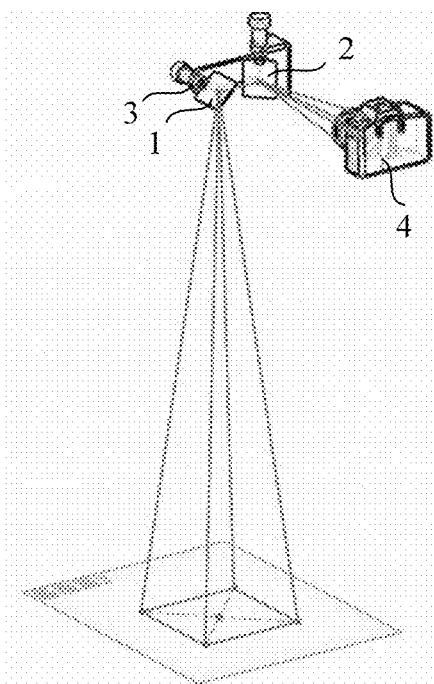
FIG. 1 is a structural schematic diagram of a shooting device in a preferred embodiment of the present application.

FIG. 1 is a structural schematic diagram of a shooting device in a preferred embodiment of the present application. As shown in FIG. 1, the shooting device 100 includes a first reflector 1, a second reflector 2, a bracket 3, driving parts and a camera 4.

Figure 2:
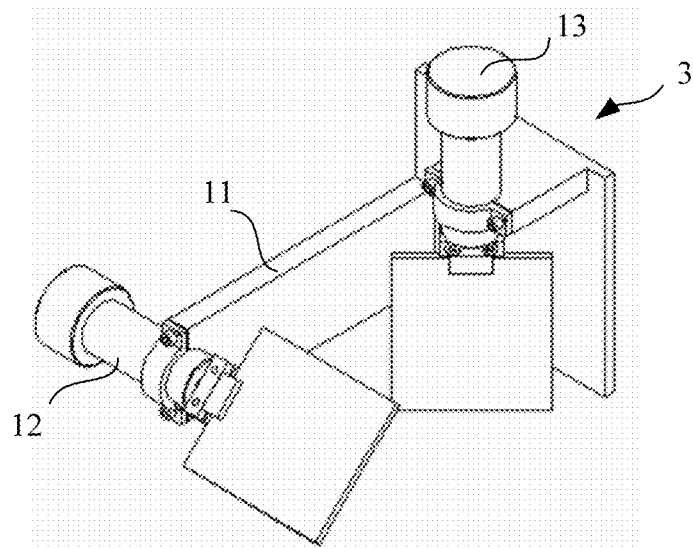
FIG. 2 is a partial schematic diagram of a bracket in FIG. 1.

The first reflector 1 and the second reflector 2 change the light path of light, and the second reflector 2 is arranged to be opposite to a reflecting surface of the first reflector 1. Please refer to FIG. 2, the bracket 3 is used for supporting the first reflector 1 and the second reflector 2, the bracket 3 includes a connecting plate 11, a first rotating seat 12 and a second rotating seat 13, the first rotating seat 12 is fixedly connected with one end of the connecting plate 11 in a rotatable manner, and the first rotating seat 12 is used for clamping the first reflector 1, so that the first reflector 1 is driven to rotate by the rotation of the first rotating seat 12 relative to the connecting plate 11, in order to change its position angle. The second rotating seat 13 is fixedly connected with the other end of the connecting plate 11 in the rotatable manner, and the second rotating seat 13 is used for clamping the second reflector 2, so that the second reflector 2 is driven to rotate by the rotation of the second rotating seat 13 relative to the connecting plate 11, in order to change its position angle. The first rotating seat 12 is hinged with one end of the connecting plate 11, and the second rotating seat 13 is hinged with the other end of the connecting plate 11. In the embodiment, the first reflector 1 and/or the second reflector 2 are total reflection mirrors. Further, the first reflector 1 and/or the second reflector 2 are metal coated lenses. An included angle of the reflecting surface of the first reflector 1 and the reflecting surface of the second reflector 2 is 90 degrees, so as to guarantee the photo shooting quality and effect.

The camera 4 is used for shooting an image reflected onto the second reflector 2, and the camera 4 is arranged to be opposite to the reflecting surface of the second reflector 2. The sizes of the first reflector 1 and the second reflector 2 are determined according to a chip of the camera. During working, the light path is reflected to the lens of the camera 4 by the first reflector 1 and the second reflector 2, and the camera 4 takes a photo.

The driving parts include a first driving part and a second driving part used for respectively driving the first rotating seat 12 and the second rotating seat 13 to rotate to adjust position angles. The first driving part drives the first rotating seat 12 to rotate, and the second driving part drives the second rotating seat 13 to rotate. The first driving part and/or the second driving part are motors.

In order that the shooting device 100 acquires a larger visual angle, the first driving part and the second driving part respectively drive the first rotating seat 12 and the second rotating seat 13 to carry out reciprocating vibration at a preset frequency, in order to cause the first reflector 1 and the second reflector 2 fixed on the first rotating seat 12 and the second rotating seat 13 respectively to carry out reciprocating vibration at the preset frequency respectively, and thus the shooting visual angle is increased. The reciprocating vibration angle is ±40°. Preferably, the reciprocating vibration angle is ±20°. Specifically, the preset frequency can reach 45000 point/second.

Based on the same inventive concept, the present application further provides an unmanned aerial vehicle, including the aforementioned shooting device 100.

When the unmanned aerial vehicle is flying, the shooting device 100 is adopted, and the first rotating seat 12 and the second rotating seat 13 carry out the reciprocating vibration at the preset frequency, which guarantees the quality of the image shot by the unmanned aerial vehicle on one hand, and increases the shooting visual angle on the other hand. The bracket 3 is provided to change the light path, and the first reflector 1 and the second reflector 2 are vibrated to improve the image quality of the shot photo and improve the response speed of the shooting device 100 in the unmanned aerial vehicle, and the entire shooting device 100 does not need to be rotated.

The present application has the following beneficial effects:

According to the shooting device and the unmanned aerial vehicle provided by the present application, during shooting in a flying process, the driving parts drive the first rotating seat and the second rotating seat to rotate to drive the first reflector and the second reflector to vibrate at the preset frequency, which guarantees the quality of the shot image in the flying process on one hand, and increases the shooting visual angle on the other hand; the first rotating seat and the second rotating seat are respectively hinged with the first reflector and the second reflector and can rotate relatively to change the light path, so that the response speed of the shooting device is improved without rotating the entire shooting device, the technical problems of inconvenient control, low response speed, high requirements on lens and high cost of the shooting device for the unmanned aerial vehicle in the prior art are solved, and the technical effects of convenient control, low cost, large shooting visual field, high response speed and high image quality of the shooting device are achieved.

Finally, it should be noted that the above embodiments are merely used for illustrating the technical solutions of the present invention, rather than limiting the same. Although the present invention has been described in detail with reference to the examples, those of ordinary skill in the art should understand that modifications or equivalent substitutions can be made to the technical solutions of the present invention without departing from the spirit and scope of the technical solutions of the present invention, and these modifications or equivalent substitutions shall fall within the scope of the claims of the present invention.

What is claimed is:

1. A shooting device, comprising:
   a first reflector;
   a second reflector arranged to be opposite to a reflecting surface of the first reflector;
   a bracket, wherein the bracket comprises:
   a connecting plate configured to connect the first reflector and the second reflector to perform reciprocating vibration at a preset frequency,
   a first rotating seat, which is fixedly connected with one end of the connecting plate in a rotatable manner and is used for clamping the first reflector, the first rotating seat having a first motor configured to individually control the first rotating seat,
   a second rotating seat, which is fixedly connected with the other end of the connecting plate in the rotatable manner and is used for clamping the second reflector, the second rotating seat having a second motor configured to individually control the second rotating seat; and
   a camera arranged to be opposite to the reflecting surface of the second reflector;
   wherein a light path is reflected to a lens of the camera by the first reflector and the second reflector, and the camera shoots a photo.

2. The shooting device of claim 1, wherein an included angle of the reflecting surface of the first reflector and the reflecting surface of the second reflector is 90 degrees.

3. The shooting device of claim 1, wherein the first motor and the second motor respectively drive the first rotating seat and the second rotating seat to carry out the reciprocating vibration at the preset frequency.

4. The shooting device of claim 3, wherein a reciprocating vibration angle is ±40°.

5. The shooting device of claim 3, wherein a reciprocating vibration angle is ±20°.

6. The shooting device of claim 1, wherein the first reflector and the second reflector are total reflection mirrors.

7. The shooting device of claim 6, wherein the first reflector and/or the second reflector are metal coated lenses.

8. An unmanned aerial vehicle, comprising the shooting device of claim 1.

9. A shooting device, comprising:
a first reflector;
a second reflector arranged to be opposite to a reflecting surface of the first reflector;
a bracket, wherein the bracket comprises:
a connecting plate configured to connect the first reflector and the second reflector to perform reciprocating vibration at a preset frequency,
a first rotating seat, which is fixedly connected with one end of the connecting plate in a rotatable manner and is used for clamping the first reflector, the first rotating seat having a first motor configured to individually control the first rotating seat,
a second rotating seat, which is fixedly connected with the other end of the connecting plate in the rotatable manner and is used for clamping the second reflector, the second rotating seat having a second motor configured to individually control the second rotating seat; and
a camera arranged to be opposite to the reflecting surface of the second reflector;
wherein a light path is reflected to a lens of the camera by the first reflector and the second reflector, and the camera shoots a photo; and
wherein the reciprocating vibration improves image quality of the photo.

* * * * *